Aug. 23, 1938.    C. R. ROCHE    2,127,754
FREEWHEELING APPARATUS AND CLUTCH CONTROL
Filed Feb. 24, 1931
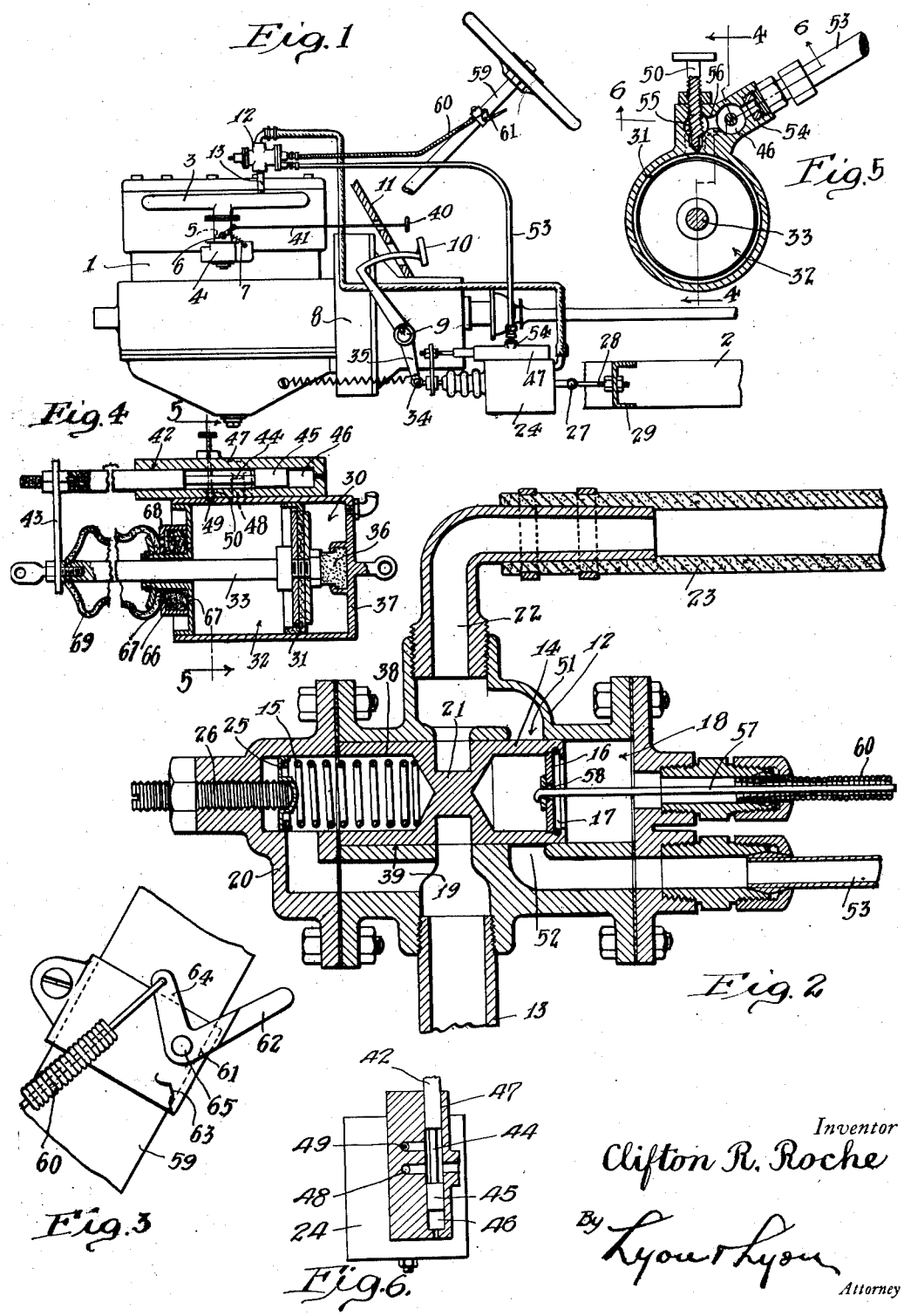
Inventor
Clifton R. Roche
By Lyon & Lyon
Attorney Patented Aug. 23, 1938

2,127,754

UNITED STATES PATENT OFFICE 2,127,754

FREEWHEELING APPARATUS AND CLUTCH CONTROL

Clifton R. Roche, Los Angeles, Calif., assignor to Bendix Products Corporation, South Bend, Ind., a corporation of Indiana Application February 24, 1931, Serial No. 517,862

19 Claims. (Cl. 192—.01)

This invention relates to a clutch control apparatus to be incorporated in an automobile to operate in conjunction with the engine to enable the clutch to be controlled automatically by the vacuum in the manifold so as to avoid the necessity for the driver's opening the clutch pedal when forced to stop, for example, when driving in congested traffic; also to attain a freewheeling effect, that is to say, to enable the automobile to roll under its own momentum while the clutch is held open and the engine is running idling. Mechanism for attaining the freewheeling effect has been developed heretofore, but this is usually embodied in the transmission mechanism, or at some other point in the driving mechanism, and such mechanism does not control the clutch, but usually includes an additional clutch which is an overriding clutch, that must be built into the mechanism at some point.

It has been proposed heretofore to utilize the vacuum in the manifold to open the regular driving clutch of the car, but such control was not automatic and was brought into operation by a mechanical connection to the accelerator pedal.

The general object of this invention is to provide apparatus of simple construction, for controlling the regular driving clutch, and which can be readily built into an original power plant installation in an automobile, or which can be readily added to an automobile already in use as an attachment or accessory.

A further object of the invention is to provide apparatus of this kind which will operate automatically to open the driving clutch of the engine whenever the operating fluid for the engine is shut off sufficiently to raise the vacuum in the manifold to a point that will operate a valve, in other words, to effect the opening of the clutch automatically through the agency of the vacuum in the manifold. While this improvement is particularly applicable to automobiles driven by 4-cycle gasoline engines, it is capable of application in any engine controlled by a throttle.

A further object of the invention is to provide simple means operatable at will to inhibit the automatic clutch control, so that whenever desired by the driver of the automobile the clutch control, or freewheeling can be temporarily discontinued.

A further object of the invention is to provide apparatus for enabling an automobile to be brought to a stop without the driver's being obliged to open the clutch by moving the pedal with his foot; this enables an automobile to be driven in traffic where it must stop again and again without subjecting the driver to constant opening and closing of the clutch.

As described in the following specification, the invention is applied to an automobile having a spring closing clutch, and one of the objects of the invention is to provide means operating when the clutch is closing automatically to prevent the too sudden closing of the clutch; in other words, the invention provides means for preventing the clutch members from slapping together violently when the clutch closes. At the same time, one of the objects of the invention is to permit the first part of the closing movement of the clutch to be accomplished very quickly, but providing means for slightly retarding the final closing movement. In this way, no time is lost in closing the clutch, but the relatively movable member of the clutch is not permitted to slap violently against the driving member.

A further object of the invention is to provide simple means for cushioning the opening movement of the clutch so as to render the operation of the apparatus noiseless, and also operating to prevent any shock when the automatic clutch opening apparatus comes into operation.

The invention preferably embodies a pneumatic cylinder, one end of which is connected to the engine in such a way as to actuate a piston in the pneumatic cylinder, and one of the objects of the invention is to provide automatic means for open communication between the ends of the cylinder when the freewheeling apparatus is not in operation, thereby insuring that the pneumatic cylinder will not resist in any way the free operation of the clutch by means of the ordinary clutch pedal. That is to say, according to the invention, when it is not desired to use the freewheeling mechanism, the clutch can be controlled by the regular clutch pedal with substantially the same freedom of movement as though the freewheeling apparatus was not present.

Further objects of the invention will appear hereinafter.

The invention consists in the novel parts and combinations of parts to be described hereinafter, all of which contribute to produce an efficient freewheeling apparatus and clutch control.

In the drawing:—

Figure 1 is a side elevation of a diagrammatic nature, certain parts being shown in section and illustrating an embodiment of my invention.

Fig. 2 is a vertical section taken through a pneumatic valve, which preferably forms a part of the apparatus and showing a portion of the engine intake to which it is connected; in this view, connections to the valve are illustrated in section and broken away.

Fig. 3 is a side elevation illustrating a detail of the hand control for inhibiting the freewheeling apparatus and showing a portion of the steering post at the point where the same may be attached.

Fig. 4 is a vertical section taken about on the line 4—4 of Fig. 5 and extending longitudinally of the pneumatic cylinder which effects the opening of the clutch when the free wheeling apparatus comes into operation.

Fig. 5 is a cross-section taken about on the line 5—5 of Fig. 4 and further illustrating details of the pneumatic cylinder and the means associated therewith for preventing the slapping shut of the clutch when the free wheeling is discontinued.

Figure 6 is a sectional view of the pneumatic cylinder taken on line 6—6 of Figure 5.

Before proceeding to a detailed description of the invention, it should be stated that the invention as illustrated is applied to a clutch of the common spring closing type, that is to say, when driving is taking place through the clutch, the clutch is held closed by a spring. The automobile may be provided with the usual clutch pedal for opening the clutch and with a throttle operating device or accelerator which can be operated at will by the hand or foot of the driver to accelerate the engine. According to my invention, I provide automatic means for opening the clutch whenever the throttle of the engine is closed and for effecting the automatic closing of the clutch as soon as the throttle is opened to any extent to accelerate the automobile. At some point, preferably on the steering post and within easy reach of the driver, I provide means, controllable at will of the driver to inhibit the operation of the free wheeling apparatus.

Referring more particularly to the parts, 1 indicates an ordinary gasoline engine mounted in an automobile frame 2 and provided with an intake manifold 3 to which carbureted air is supplied from a carburetor 4 through a throttle valve 5. This throttle valve is provided with a lever 6 and is normally held substantially closed by a spring 7. Carburetors of this type in their closed position permit a small amount of carbureted air to pass into the engine, which is just sufficient to enable the engine to idle. The engine is provided with a spring closing clutch 8, and this clutch may be opened by rotating a clutch shaft 9. In the present instance, this clutch shaft is provided with a foot-operated pedal 10 that projects through the floor board 11 within reach of the driver's foot.

In applying my invention to an automobile having an engine of this type, I provide a spring actuated pneumatic valve 12 which may, if desired, be connected to the intake manifold by a short tubular nipple 13. This valve is illustrated in detail in Fig. 2. It is constructed so that when the throttle valve 5 is in its closed position the relatively high vacuum formed in the valve 12 will pull the valve plunger 14 over to an extreme position, as shown in Fig. 2, thereby compressing a coiled spring 15 which urges the plunger in the opposite direction. The end of the valve plunger opposite the spring is provided with a head 16, which may be held in place by a removable wire follower 17, and this end of the valve casing forms an air chamber 18. The opposite end of the valve is connected by a passage 19 to the nipple 13, which extends into a head 20 at this end of the valve. When the partial vacuum in the manifold is high, the atmospheric pressure in the chamber 18 forces the valve plunger over, as indicated, so as to bring its reduced middle portion or waist 21 in communication with the nipple 13 and a suction connection 22 that is connected by tube 23 with one end of a pneumatic cylinder 24 that will be described more in detail hereinafter.

The spring 15 seats at its left end against an adjustable head 25 mounted on the end of a set screw 26. This enables the force of this spring to be adjusted as may be desired. The pneumatic cylinder 24 is illustrated in detail in Fig. 4. Its rear end is pivotally supported on a horizontal pivot pin 27 that is carried on a bar 28 that is secured on a cross-bar 29 of the frame and mounted so that it is adjustable in a front-and-rear direction. The pneumatic cylinder is connected by suitable means with the clutch shaft 9, so that when a partial vacuum is developed in the chamber 30 at the right of its plunger 31 the plunger will be forced to the right by atmospheric pressure in the air chamber 32, thereby rotating the clutch shaft 9 in the same direction that it is rotated when the pedal 10 is depressed by the foot. For this purpose, the piston rod 33 of the plunger head or piston 31 is connected by a pin 34 with the end of an arm 35 extending down from the clutch shaft 9. Suitable means is provided for cushioning the opening movement of the clutch. In order to do this, I provide a yielding cushion or bumper 36 of rubber, or similar material, which is attached on the inner face of the rear head 37 of the cylinder.

The left end of the plunger 14 consists of a head 38 of relatively large diameter that fills the bore 39 formed in the valve casing, in which the plunger 14 slides, and when the valve plunger is in its extreme right-hand position under the action of the spring 15 this head 38 closes communication between the nipple 13 and the connection 22, which cuts off connection between the manifold and the pneumatic cylinder 24. This condition occurs when the engine is running with the clutch closed and the engine not idling. At such a time, the driver would be holding the throttle valve open by pressing with his foot on an accelerator 40 in the form of a push rod 41, the forward end of which is attached to the lever 6 of the throttle valve. The vacuum in the manifold is then too low to hold the plunger 14 over to the left.

With this construction it will be evident that if the driver of the car presses on the accelerator 40 the throttle valve will become open, thereby reducing the partial vacuum in the intake manifold 3 and in the port 19 which leads around to the left end of the bore 39, thereby permitting the spring 15 to extend itself and throw the plunger 14 over to its extreme right-hand position, thereby cutting off the communication to the pneumatic cylinder. If the throttle valve 5 is suddenly opened in this way, there might be a tendency for the clutch to "slap" into its closed position if the motion of the plunger 31 to the left is unrestricted. For this purpose, I prefer to construct the pneumatic cylinder 24 in such a way that the first part of the movement of the plunger 31 toward the left will be relatively free, but I prefer to provide means for checking the latter part of this movement, thereby cushioning the closing of the clutch and preventing the "slapping" effect referred to. Any suitable means may be employed for this purpose that will operate in the first part of the movement of the piston 31 to relieve the partial vacuum formed in the chamber 30 to permit the piston to move freely and later on operate to choke more or less the admission of air to this chamber, thereby retarding the movement of the rod 33 and consequently the closing of the clutch. I prefer to accomplish this effect by permitting air forced out of the chamber 32 to be by-passed through the automatic valve 14 and through the connection 23 to the chamber 30. For this purpose, I provide a mechanically operated valve 42 which is attached to a cross-head 43 rigid with the piston rod 33 of the pneumatic cylinder 24. This valve 42 has a waist 44 of reduced diameter and has an enlarged head 45 at its rear end filling the bore 46 of a small cylinder or valve casing 47 in which this valve slides and which is attached to the side of the pneumatic cylinder 24. The chamber 32 of the pneumatic cylinder is connected by a port 48 with the bore 46 through which air in the chamber 32 may move freely as the piston head 31 moves toward the left, and this air is passed by valve 14 (when in its extreme right-hand position) around to the chamber 30. In other words, air may move freely into the chamber 30 on the first part of its movement, but toward the end of the movement the head 45 of the valve 42 will cover the port 48 and restrict the passage of air to chamber 30. After this the air passing to chamber 30 will have to flow through a bleeder port 49 controlled by a needle valve 50, which can be adjusted to any desired position to regulate the retarding action, and control the period of time necessary for the clutch to close from a nearly closed position.

In order to open communication from the chamber 32 to the chamber 30, I provide the casing of the pneumatic valve 12 with ports 51 and 52, the former of which communicates at its side with the connection 22, and the latter of which communicates through a pneumatic tube 53 with bore 46 through an extension 54 projecting from the side of the mechanical valve casing 47; and the bore 46 communicates through a port 56 with the valve chamber 55 of bleeder valve 50. With this arrangement, it will be evident that when the plunger 14 is in its extreme right-hand position the compartment 30 is open to atmospheric pressure and the clutch can then be operated freely by means of its pedal 10.

One advantage of providing this connection between the ends of the pneumatic cylinder 24 is that all the air admitted into both ends of this cylinder will be clean because it may be admitted through an air filter (as will appear hereinafter) built into the cylinder head of the cylinder 24 toward which the piston 31 moves in permitting the clutch to close. It will also be evident that by reason of the admission of atmospheric air to the chamber 30 of the cylinder 24 the clutch can be freely opened and closed by operating the pedal 10 when the apparatus has been inhibited in its operation, as will now be described.

In order to enable the operation of the pneumatic valve 12 to be inhibited at will to eliminate action of the automatic opening of the clutch, I provide means operable at will by the driver for pulling the plunger 14 over to its extreme right-hand position. For this purpose, I provide a pull wire 57 that is attached, through a large hole 58, to the head 16 and passes to the steering post 59 through a suitable flexible conduit 60. The end of this pull wire attaches to a bell-crank lever 61 which, during free wheeling, is in the position indicated in Fig. 1. By shoving the long arm 62 of this lever down against the stop 63 on the side of the steering post, the short arm 64 of the bell-crank lever can be moved far enough so as to bring the line of pull of the wire in line with the pivot 65 of the bell-crank lever, and this will put the pull on the "dead center" and keep the valve in its right-hand position, even though the throttle valve is closed.

By using a large opening 58 for the wire 57 in the head 16 it will be evident that the plunger 14 can be moved to the right by the spring 15 without pushing on the wire 57. In other words, there is a lost motion connection between the wire 57 and the plunger 14.

The air passing into the pneumatic cylinder may be admitted through a filter box 66 (see Fig. 4) filled with felt or other suitable material to act as a filter for the air which may pass in through small perforations 67 in the adjacent head 68 of the pneumatic cylinder. Between the filter box and the outer end of the cross-head a flexible and extensible sleeve 69 may be provided to keep the plunger rod 33 free of dust.

In referring to an automobile in this specification, it is understood that this term applies to buses, or any other vehicle.

It is understood that the embodiment of the invention described herein is only one of the many embodiments this invention may take, and I do not wish to be limited in the practice of the invention, nor in the claims, to the particular embodiment set forth.

What I claim is:

1. In an automobile having a clutch, the combination of a gas engine having an intake manifold of varying vacuum conditions, a pneumatic appliance, a connection from the intake manifold to the pneumatic appliance for controlling the latter, a spring actuated pneumatically controlled valve in said connection operating to open the connection when a relatively high partial vacuum is in the intake manifold, means connecting the pneumatic cylinder with the clutch to open the clutch, hand-operated means near the driver's position and operatable at will for pulling the spring actuated valve in a direction to oppose the force acting on the valve through the agency of the partial vacuum in the intake, to inhibit the action of the valve and enable the automobile to be driven at will without free wheeling or automatic clutch control.

2. In an automobile having a clutch, the combination of a gas engine having an intake manifold of varying vacuum conditions, a pneumatic appliance, a connection from the intake manifold to the pneumatic appliance for controlling the latter, means for maintaining said connection open when a relatively high partial vacuum is in the intake manifold, means for closing said connection and opening the pneumatic appliance to atmosphere when a relatively low vacuum is in the manifold, means connecting the pneumatic appliance with the clutch to operate the clutch, and means associated with the pneumatic appliance for permitting relatively free passage of air into the appliance until the clutch is partly closed and then to restrict the passage of air so as to regulate the speed at which the clutch closes.

3. In an automobile having a clutch, the combination of a gas engine having an intake manifold with varying vacuum conditions within the same, a pneumatic appliance, a connection from the intake manifold to the pneumatic appliance for controlling the latter, a spring actuated pneumatically controlled valve in said connection operating to open the connection when a relatively high partial vacuum exists in the intake manifold, means connecting the pneumatic appliance with the clutch to open the clutch, said spring actuated valve being capable of assuming a position in which it allows the pneumatic appliance to be open to atmospheric pressure and thereby permit the clutch to be operated by its pedal, and hand controlled means for holding the valve in said position.

4. In an automobile having a clutch, the combination of a gas engine having an intake manifold with varying vacuum conditions within the same, a pneumatic appliance, a connection from the intake manifold to the pneumatic appliance for controlling the latter, a spring actuated pneumatically controlled valve in said connection operating to open the connection when a relatively high partial vacuum exists in the intake manifold, means connecting the pneumatic appliance with the clutch to open the clutch, said spring actuated valve being capable of assuming a position to cut out said connection, a pedal to operate the clutch, and a hand controlled means for holding the valve in the position in which said connection is cut out.

5. The combination with an internal combustion engine having an inlet manifold, a valve controlling vacuum conditions in the manifold, controlling means for the valve, a clutch connecting the engine with a driven mechanism, a vacuum controlled valve and vacuum-operated actuating means controlled by the valve for controlling the clutch during the operation of the engine and operating to automatically disconnect the clutch when the engine throttle is closed sufficiently to develop an effective operating vacuum in the intake manifold to actuate said vacuum controlled valve, and means independent of the first-named valve for inhibiting the actuation of the vacuum-controlled valve.

6. In an automobile having a clutch, the combination of a gas engine having an intake manifold with varying vacuum conditions within the same, a pneumatic appliance attached to the clutch to operate the clutch, a communicating connection between the intake manifold and the pneumatic appliance, a spring-pressed valve in said communicating connection, said valve being operated by the varying vacuum conditions within the intake manifold and controlling the communication between the intake manifold and the pneumatic appliance, and means operatable by the driver to hold the valve in a position so that it can not be operated by the vacuum.

7. The combination with an internal combustion engine adapted to create a vacuum, of a clutch connecting the engine with a driven mechanism, a vacuum operable device for actuating said clutch, a valve automatically controlled by the vacuum created in the engine for making and breaking the vacuum to said device, and means for adjusting said valve for adapting the operation thereof to engines having various vacuum creating capacities.

8. In a controlling device for a motor comprising a casing, a member movable therein between at least two positions, said member having at least two oppositely disposed faces and means to constantly expose said faces, respectively, to forces differing in magnitude whereby said member tends to be moved between said positions, and adjustable means to oppose such movement until the difference in the forces decreases below a predetermined minimum.

9. In a controlling device for a motor comprising a casing, a member movable therein between at least two positions, said member having two oppositely disposed faces and means to constantly expose said faces, respectively, to forces differing in magnitude whereby said member tends to be moved between said positions, adjustable means to oppose such movement until the ratio of the forces is less than a predetermined minimum, and means controlled by said member to initiate the operation of the motor.

10. In a controlling device for a pneumatically operated motor comprising a casing, a member movable therein between at least two positions, said member having at least two oppositely disposed faces and means to constantly expose said faces to differential pneumatic pressure, a spring engaging the member and opposing movement of the member under differential pneumatic pressures less than a predetermined minimum, and means to adjust the tension of the spring.

11. In a controlling device for a motor comprising a casing, a member movable therein between at least two positions, said member having two oppositely disposed faces and means constantly exposing said faces, respectively, to forces differing in magnitude whereby said member is moved between positions, adjustable means to oppose such movement until the ratio of the forces is less than a predetermined minimum, means controlled by said member to initiate the operation of the motor, and manual means to render the motor inoperative.

12. In combination, means in which fluid pressure fluctuates, a motor operated by fluid pressure differential, a shifting element operatively connected with the motor for movement thereby, means to expose the motor to sub-atmospheric pressure, and adjustable means to prevent the actuation of the motor until sub-atmospheric pressure attains a predetermined value.

13. In a device of the character described, the combination with a part to be actuated, a motor operatively connected with said part for actuation thereof and operated by fluid pressure differential, a chamber in which fluid pressure fluctuates, a communicating connection with the motor and, respectively, the chamber and the atmosphere, means to selectively open said connection with the chamber and with the atmosphere responsive to fluctuations of the fluid pressure in the chamber, and means to adjust the responsiveness of said last named means.

14. In a device of the character described, the combination with a part to be actuated, a pneumatic motor operatively connected with said part for actuation thereof, suction producing means in which the suction varies, said pneumatic motor being in communication with the suction producing means, an automatic bleed for the pneumatic motor solely responsive to a predetermined variation in the suction in said suction producing means, and means to regulate the degree of responsiveness of the automatic bleed.

15. In a device of the character described, a valve comprising a casing, a valve member movable therein between at least two positions and having oppositely directed faces, said casing being formed with a first port whereby a fluid pressure of low degree is applied to one valve face, a second port whereby fluid pressure of a higher degree is applied to the other valve face, a third port for communication with a pneumatic motor, a fourth port open to the same degree of fluid pressure as the first port and bleed port, said valve member having means which, in one position of the valve opens communication between the third and fourth ports and in the other position of the valve opens communication between the bleed port and the third port, and means opposing movement of the valve member under differential fluid pressures less than a predetermined minimum.

16. In a device of the character described, a valve comprising a casing, a valve member movable therein between at least two positions and having oppositely directed faces, said casing being formed with a first port whereby a fluid pressure of low degree is applied to one valve face, a second port whereby fluid pressure of a higher degree is applied to the other valve face, a third port for communication with a pneumatic motor, a fourth port open to the same degree of fluid pressure as the first port and a bleed port, said valve member having means which, in one position of the valve opens communication between the third and fourth ports and in the other position of the valve opens communication between the bleed port and the third port, means opposing movement of the valve member under differential fluid pressures less than a predetermined minimum, and adjusting means for said last named means.

17. In a device of the character described, a valve comprising a casing, a valve member movable therein between at least two positions and having oppositely directed faces, said casing being formed with a first port whereby a fluid pressure of low degree is applied to one valve face, a second port whereby fluid pressure of a higher degree is applied to the other valve face, a third port for communication with a pneumatic motor, a fourth port open to the same degree of fluid pressure as the first port and a bleed port, said valve member having means which, in one position of the valve opens communication between the third and fourth ports and in the other position of the valve opens communication between the bleed port and the fourth port, a spring opposing movement of the valve member under differential fluid pressures less than a predetermined minimum, and means to adjust the tension of the spring.

18. In an automotive vehicle provided with an internal combustion engine and a clutch, a pneumatic appliance having two power fluid receiving compartments, fluid transmitting means interconnecting one compartment of said appliance with the intake manifold of said internal combustion engine, a control valve for said appliance constituting an element of said fluid transmitting means, and means for bypassing fluid from the other compartment of said appliance to said first mentioned compartment via said fluid transmitting means to control the clutch engaging operation of said appliance, said bypassing means comprising a second conduit interconnecting said appliance with the aforementioned control valve and further comprising a valve structure interposed in said second conduit, said valve structure comprising relatively movable members one of said members being operatively connected with the aforementioned power element of the pneumatic appliance.

19. In an automotive vehicle provided with an internal combustion engine and a clutch, a pneumatic appliance having two power fluid receiving compartments, fluid transmitting means interconnecting one compartment of said appliance with the intake manifold of said internal combustion engine, a control valve for said appliance constituting an element of said fluid transmitting means, and means for bypassing fluid from the other compartment of said appliance to said first mentioned compartment via said fluid transmitting means to control the clutch engaging operation of said appliance, together with manually operable valve means cooperating with said control valve and operable to cut out the operation of said control valve and permanently interconnect said fluid transmitting means and bypass means.

CLIFTON R. ROCHE.